April 9, 1963 J. B. BURNHAM, JR 3,085,059
FUEL ELEMENT FOR NUCLEAR REACTORS
Filed Oct. 2, 1958
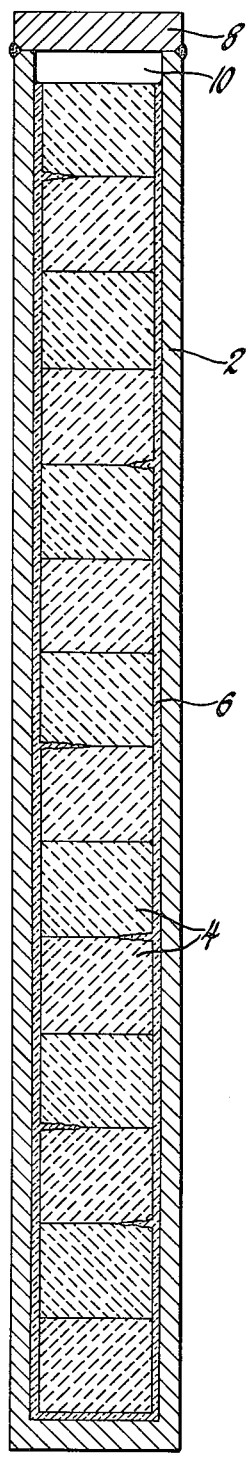
INVENTOR.
John B. Burnham, Jr.
BY
Paul J. Peisling
ATTORNEY 3,085,059
FUEL ELEMENT FOR NUCLEAR REACTORS
John B. Burnham, Jr., Bloomfield Hills, Mich., assignor to General Motors Corporation, Detroit, Mich., a corporation of Delaware
Filed Oct. 2, 1958, Ser. No. 764,948
5 Claims. (Cl. 204—193.2)

This invention relates to a fuel element for nuclear reactors. More particularly, the invention relates to an improved fuel element of the type comprising a fissionable ceramic material such as an oxide, carbide or nitride of uranium, plutonium, thorium or other fissionable element encased in a suitable metal to protect it against chemical attack from contact with the reactor moderator or coolant. Most well known and common of the fissionable ceramic materials is uranium oxide, $UO_2$.

Metal-encased ceramic type fuel elements have various advantages which are well recognized; however, their usage has been hampered to a great extent because of their high cost of manufacture and, more importantly, because of their low thermal conductivity. The high cost of heretofore proposed metal-encased ceramic fuel elements has been due in large measure to the extensive machining or other shaping operations required to obtain a uniformly close fit between the fissionable ceramic and the metal casing in order to improve heat conduction from the ceramic through the casing. That is, the practice has been to accurately control the interior shape of the metal casing and the exterior surfaces of the encased ceramic inserts in order to avoid operational failure of the fuel element due to hot spots which would otherwise result from void spaces within the element. Even the best such mechanical fitment of parts has serious limitations as far as heat conduction is concerned, it being practically impossible to attain absolutely uniform and continuous contact between the ceramic and the casing.

It is an object of the present invention to provide a metal-encased ceramic fuel element which has uniformly high heat conductivity from the ceramic through the metal casing. Another object of the invention is to provide an improved metal-encased ceramic fuel element which is relatively simple to manufacture and therefore of low cost. More specifically, an object of the present invention is the provision of a metal-encased ceramic fuel element wherein uniformly high heat conductivity between the ceramic and the metal casing may be obtained without the requirement for extremely close tolerances and therefore without the requirement for extensive and costly shaping operations.

These objects are accomplished in accordance with the invention by a fuel element structure which includes a metal casing containing one or more pellets of fissionable ceramic material and a layer of vitreous material between and bonded to the ceramic pellets and the casing to assure uniformly good heat conduction from the pellets to the casing. Because of the vitreous material, the necessity for an extremely close fit between the pellets and between the pellets and the casing is obviated and production costs greatly reduced.

Other features, objects and advantages of the invention will appear more fully from the following detailed description thereof and from the drawing which shows a side view in section of a fuel element made in accordance with the invention.

Referring now to the drawing, the fuel element shown consists of a tubular cylindrical metal casing 2 closed at both ends and containing a stack of substantially uniformly sized cylindrical pellets 4 of fissionable ceramic such as $UO_2$ which are shaped, within convenient manufacturing tolerances, to fit relatively snugly within the casing, and a layer of vitreous material 6 between the pellets and the casing and between the pellets where necessary to fill voids resulting from any manufacturing inaccuracies in the shape of the casing or the pellets. In the drawing the thickness of the layer 6 is exaggerted for purposes of illustration.

The casing may be of any metal having suitable structural and nuclear properties, for example zirconium, stainless steel or niobium. It is desirable that the pellets be of high density and, to this end, they are preferably made by pressing or otherwise forming a pulverant mass of the fissionable ceramic and then firing at sintering temperatures, all as well known in the art. During the firing operation there is considerable densification and therefore a certain amount of shrinkage. Thus the pellets should be originally shaped to greater dimensions than those finally desired. Also during the firing operation, there will usually be a certain amount of warpage, particularly if the pellets are elongated or rod-shaped. Thus, it is preferable to utilize a plurality of smaller pellets within the casing. Not only is there less warpage in the firing of the smaller pellets, but also any slight warpage which does result is not such as to prevent insertion of pellets into the casing, and with a relatively snug fit.

The vitreous material 6 between the pellets and the casing should preferably have the following properties:

(1) It should have a coefficient of thermal expansion which is such that the heat expansion characteristics of the combination of the pellets and the layer of vitreous material substantially match those of the metal casing within the operating temperature range of the reactor. Thus, in some instances it may be advantageous to use a vitreous material with a higher coefficient of thermal expansion than that of the ceramic.

(2) It should be soft and ductile, i.e., in the form of a very viscous liquid, over the normal operating temperature range at which the fuel element will function in the reactor, this to prevent cracks or shattering from mechanical or thermal stresses and to assure optimum continuous contact of the material with both the pellets and the casing. The use of a lead compound such as lead oxide in the vitreous material is helpful to attain this property.

(3) It should have good chemical stability.

(4) It should "wet" or bond to both the casing and pellet materials.

(5) Particularly where the fuel element is intended for use in a thermal reactor, the vitreous material should generally have a minimum neutron cross-section. In this connection, the elements which may be used are: Pb, Si, Na, K, Ca, Al, Ba, O, Mg, Ti, Zn, Be, P, As, Fe, Mn, Co, Li, F, V, Cr, Ni, Cu, Ge, Se, Sr, Zr, Nb, Mo, Pd, Ag, Sn, Sb, Te, I, Cs, La, Ce, Ta, W, Pt, Au, Tl, Bi, Th, Pa, U. The amounts of those elements having neutron cross-sections on the high side for example, cobalt, should generally be kept at a minimum. It has been proposed in recent years that fuel elements have incorporated therein a neutron flux poison (i.e., an element or elements of high neutron cross-section) which burns out at the same rate as the fuel, the purpose being that when a new fuel element is inserted into a reactor, it provides about the same neutron flux density, and therefore the same heat, as the partially burned elements already in the reactor. Where it is desired to make such a fuel element in accordance with the present invention, suitable high neutron cross-section elements may be incorporated into the vitreous material in the quantity desired.

All of the above-mentioned properties are fully met by a wide range of glass compositions, the precise composition selected for any particular application depending, of course, upon the temperature range in which the fuel element is intended to operate. For example, in a preferred embodiment having a stainless steel casing and a stack of dense sintered UO₂ pellets, the glass used as the vitreous material between the pellets and casing had the following composition:

(1)

| | Percent |
|---|---|
| PbO | 68 |
| SiO₂ | 28 |
| Na₂O | 0.5 |
| Al₂O₃ | 2.5 |
| K₂O | 1 |

This particular lead oxide base glass, which may be made by mixing and then heating to melting temperature the oxides as listed, has a softening temperature of about 1450° F. and melts at 2250° F. remaining a thick viscous liquid at even higher temperatures.

Examples of other glass compositions suitable as the vitreous material for practice of the invention are:

(2)

| | Percent |
|---|---|
| PbO | 54.1 |
| SiO₂ | 40.8 |
| Na₂O | 1.1 |
| Al₂O₃ | 4.0 |

(3)

| | |
|---|---|
| PbO | 36.5 |
| SiO₂ | 52.8 |
| Al₂O₃ | .2 |
| K₂O | 10.1 |
| CaO | .3 |
| As₂O₃ | .1 |

(4)

| | |
|---|---|
| SiO₂ | 51.0 |
| CaO | 6.1 |
| ZnO | 5.1 |
| BeO | 10.2 |
| P₂O₅ | 2.1 |
| BaO | 25.5 |

(5)

| | |
|---|---|
| SiO₂ | 46.6 |
| CaO | 9.3 |
| ZnO | 3.4 |
| BeO | 6.9 |
| P₂O₅ | 3.0 |
| BaO | 25.8 |
| TiO₂ | 5.0 |

It will be obvious to those skilled in the glass art that from the various elements having suitable nuclear properties, vitreous materials may be made having any desired softening temperature ranges and in all other respects fulfilling the requirements set forth above. Among the more common materials which may be used to make the glass are silica and the oxides, silicates and phosphates of the metals lead, aluminum, barium, calcium, magnesium, sodium, potassium, beryllium, zinc, titanium, arsenic and iron. The use of boron (i.e., the various borate and borosilicate glasses) should generally be avoided since this element has a relatively large neutron cross-section; however, as mentioned above, where it is desired to incorporate a burnable poison in the fuel element, boron as well as other high neutron cross-section elements may serve to advantage in the glass.

For practical purposes, the vitreous material will have substantially the same heat conductivity as the ceramic pellets and, thus, with all voids between the pellets and the casing filled with the material, the heat conduction to the casing will be uniform. If it is desired to increase the heat conductivity of the vitreous material, a suitable metal such as copper or nickel may be added to it in finely powdered form. Thus, the vitreous material might consist of 75% glass, for example that specified at (1) above, and 25% copper powder.

The preferred process for manufacturing the fuel elements is as follows: The tubular metal casing is made in any manner desired, one end being closed and the other end being left open. The pellets are preferably made as hereinbefore outlined, i.e., by shaping and then firing at sintering temperature. A quantity of the desired glass frit is then placed within the bottom closed end of the casing and the required number of pellets to fill the tube inserted over the frit. The assembly is then heated, preferably by induction heating, to or somewhat beyond the temperature at which the frit softens. For the specific glass composition listed above at (1), for example, a temperature of 1900° F. is satisfactory. While the assembly is in this heated state, the pellets are pressed down into the casing at about 4000 p.s.i. with a graphite rod for ten minutes or so thereby causing the melted glass to be extruded upwardly between the pellets and the casing and also between the pellets themselves, if there should be any voids. Thus, at the conclusion of this hot pressing operation the glass is in the form of a thin layer which fills any voids that would otherwise have existed between the pellets and the casing or between the pellets. Any excess glass may be removed from the top of the casing and the assembly allowed to cool. Then the casing may be sealed closed by heliarc welding a metal end cap, shown at 8 in the drawing, over the upper end thereof. A small gas space may be left at the top of the casing under the end cap to facilitate the welding operation and to provide a space for accumulation of fission gases, this as indicated at 10 in the drawing.

The precise shape of the casing will be as dictated by the reactor design, the casing shown being a simple cylinder for purposes of illustration.

As indicated previously, one of the advantages of the present invention is the substantial cost savings which it makes possible. In the manufacture of the casing and of the pellets, it is only necessary to attain reasonably close tolerances, on the order of those normal for and easily obtained by conventional manufacturing techniques. Thus, there is obviated the requirement for an extremely close fitment of parts and the extensive machining operations such as have heretofore been necessary in the making of encased ceramic fuel elements. Another and still greater advantage is, of course, the uniformly high heat conductivity of the improved fuel element. If it is desirable to obtain higher heat conductivity, a suitable powdered metal may be added to the vitreous material as mentioned above.

It is to be understood that, although the invention has been described with specific reference to particular embodiments thereof, it is not to be so limited since changes and alterations therein may be made which are within the full and intended scope of this invention as defined by the appended claims.

I claim:

1. A fuel element for nuclear reactors comprising a closed elongated metal casing, a stack of pellets of fissionable ceramic material fitted, within normal manufacturing tolerances, relatively snugly in said casing, and a layer of vitreous material between said pellets and said casing, said vitreous material consisting substantially of a combination of low neutron capture cross section elements, and having, throughout the normal operating temperature range of the fuel element, both a thick viscous consistency and a coefficient of thermal expansion between those of the metal casing and the pellets.

2. A fuel element as defined in claim 1 and wherein there is a gas space between one end of said casing and the adjacent end of the stack of pellets.

3. A fuel element for nuclear reactors comprising a closed elongated metal casing, a stack of axially aligned substantially equally sized pellets of fissionable ceramic material in said casing, each of said pellets having a width approximating, within normal manufacturing tolerances, the width of the interior of said casing, and a layer of vitreous material between said pellets and said casing where necessary to fill voids therebetween, said vitreous material consisting substantially of a combination of low neutron capture cross section elements, and having throughout the normal operating temperature range of the fuel element both a thick viscous consistency and a coefficient of thermal expansion between those of the metal casing and the pellets.

4. A fuel element as defined in claim 3 wherein the vitreous material is a lead oxide base glass.

5. A fuel element for nuclear reactors comprising a closed stainless steel casing, at least one pellet of dense sintered uranium dioxide fitted, within normal manufacturing tolerances, relatively snugly in said casing, and a thin layer of vitreous material between said pellet and said casing, said vitreous material consisting substantially of a lead oxide base glass, said glass consisting substantially of a combination of low neutron capture cross section elements, and having throughout the normal operating temperature range of the fuel element both a thick viscous consistency and a coefficient of thermal expansion between those of the metal casing and the pellets.

References Cited in the file of this patent

UNITED STATES PATENTS

| 2,728,867 | Wilson | Dec. 17, 1955 |
| 2,799,642 | Hurwitz et al. | July 16, 1957 |
| 2,838,452 | West et al. | June 10, 1958 |
| 2,841,545 | Zinn | July 1, 1958 |
| 2,852,460 | Abbott et al. | Sept. 16, 1958 |
| 2,879,216 | Hurwitz et al. | Mar. 24, 1959 |

OTHER REFERENCES

Nucleonics, August 1957, pp. 94–98.
AEC Document KAPL–1866, Sept. 9, 1957.